T. F. ROWLAND.
APPARATUS FOR RAKING GAS RETORTS.
No. 7,592.
Reissued April 3, 1877.
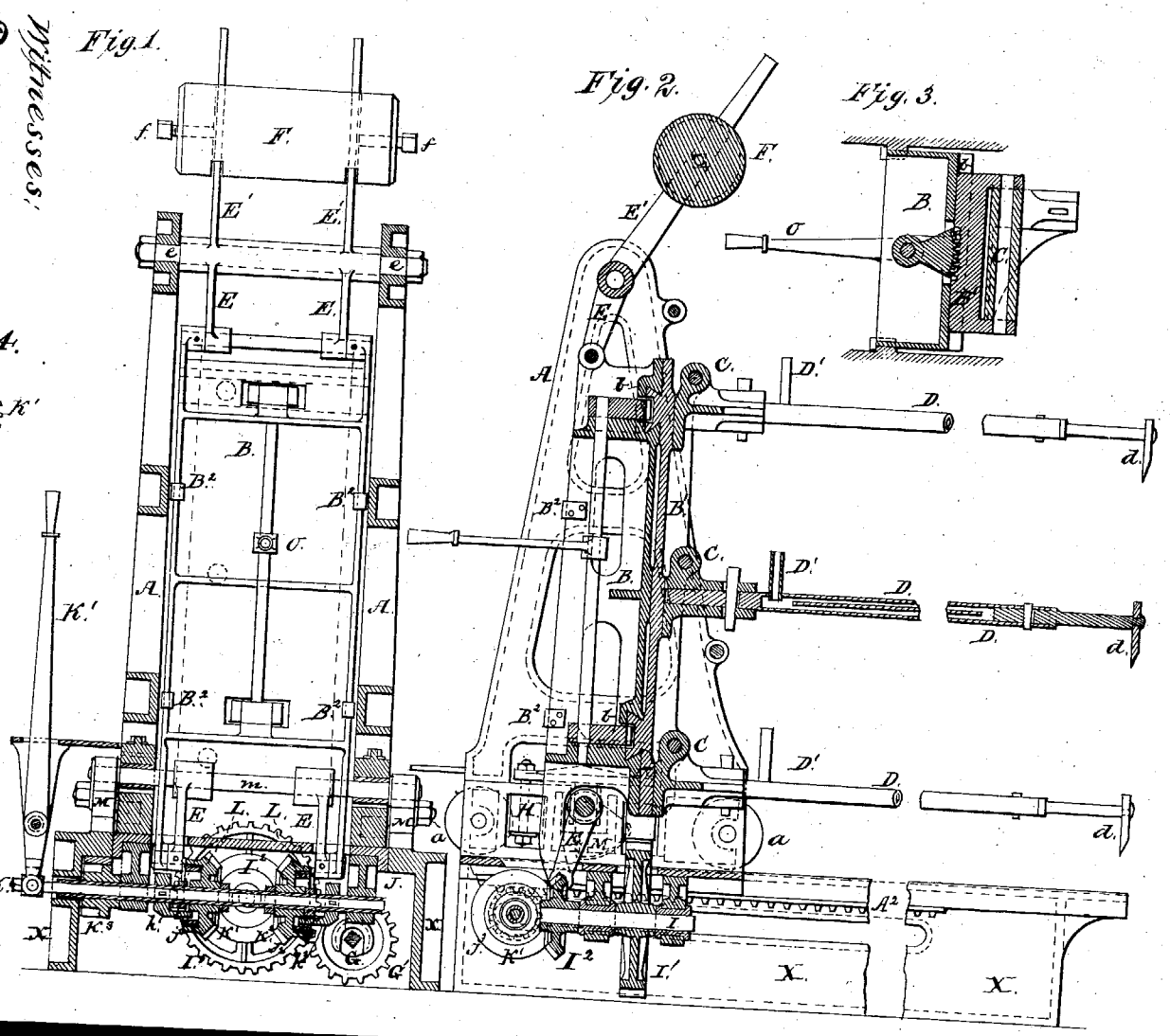
Witnesses:
E N Dickerson Jr
Warren E. Hill
Inventor
Thos F. Rowland

UNITED STATES PATENT OFFICE.

THOMAS F. ROWLAND, OF GREEN POINT, BROOKLYN, NEW YORK.

IMPROVEMENT IN APPARATUS FOR RAKING GAS-RETORTS.

Specification forming part of Letters Patent No. 137,486, dated April 1, 1873; reissue No. 7,592, dated April 3, 1877; application filed December 18, 1876.

*To all whom it may concern:*

Be it known that I, THOMAS F. ROWLAND, of Green Point, Brooklyn, in the State of New York, have invented certain Improvements relating to Machines for Emptying Gas Retorts, of which the following is a specification:

I have devised mechanism which overcomes many of the objections heretofore formidable in the raking out or discharging of retorts by machinery.

The following is a description of what I consider the best means of carrying out the several details.

The accompanying drawing forms a part of this specification.

Figure 1 is a back view of the frame which carries the rakes, and a vertical section of the supporting framing and gearing. Fig. 2 is a vertical section at right angles to Fig. 1. Fig. 3 is a horizontal section. Fig. 4 represents the preferable form of the friction-clutches which I employ to reverse the motions.

Similar letters of reference indicate correponding parts in all the figures.

X is a framing, which is, relatively to the other parts, a fixed support, but which I prefer, in practice, to carry on wheels. (Not represented.) A is a rigid framing, carried on wheels *a*, running on ways on the foundation-frame X. B is a stout frame, hung on stout levers E in the framing A, and capable of swinging thereon through nearly a quarter of a revolution of the levers. $B^1$ is a carriage carried on the framing B, and capable of a slight horizontal motion thereon, being supported and guided in such motion by strong transverse dovetails *b*, which are nicely finished and mounted in corresponding transverse grooves in the framing B. C C C are strong knuckle-joints framed on the carriage $B^1$, and supporting long levers D D D, each provided at the end with a rake-head, *d*, adapted to act on the coke in a corresponding retort.

In operating, the carriage A is moved forward toward the retorts, with the carriage $B^1$ and its connections in a lifted position. Then, on the motion of the carriage A being reversed at the will of the attendant, the carriage $B^1$, with the rakes and other connections, descends a little distance in a nearly vertical line, which introduces the several rakes into the beds of coke in the several respective retorts, and as the carriage A is moved back again the rakes draw out the coke thus seized. On moving the carriage A inward again the rakes are again lifted, and, after being carried in farther than before, they are again dropped into the coke, and again withdrawn. The coke is thus removed by several successive operations, the rakes each time entering farther than before, until the retorts are empty.

I have in my experiments, for want of a better name, termed the carriage B a "rising and sinking frame," or, more briefly, a "jumping frame." Its peculiar motions are participated in by the rakes, except when the pressure of the coke or other cause holds up the forward ends of the rakes and prevents their descending as rapidly. In such cases the knuckle-joints C become available, and by yielding allow either or all the rakes to remain slightly elevated. So soon as the retreating motion has progressed a little the rakes will invariably descend by their gravity to a position near the bottom of the several retorts.

The main portion of each lever D is tubular. The tube may be screwed or keyed into a stout casting or forging, which forms a part of the knuckle-joint. The outer portion immediately connected to the head *d* is solid, and is socketed into the tubular portion, and held by a key or other suitable means. The heads may thus be changed at will without necessitating a change of the main portion D. D′ D′ D′ are short tubes reaching upward from the levers D, and open at their upper ends to receive water, which thus fills and cools the interior of the several levers. I can, if preferred, connect hose from any suitable source to the several branches D′, and thus induce a constant circulation through each pipe, provisions being made, by a diaphragm or otherwise, for compelling the water to circulate to or near the extreme forward end of each lever, and providing for the discharge, at or near the outer end, into any suitable receptacle, which may be a ditch or gutter into the flooring below.

I have devised mechanism by which the jumping frame B and its connections may be raised and lowered at the proper period by simply changing the motion of the carriage A forward and backward. The carriage A is moved by the shaft G, which runs in fixed bearings in the sub-frame or foundation X, and is turned constantly in one direction by a steam-engine or other means. (Not represented.) This carries a wheel, G′, which is free to slide endwise on G, and is caused to so slide by means of arms descending from the carriage A, so as to be held constantly in gear with the larger wheel $I^1$, fixed on the shaft I, and carried in bearings on A. This shaft I, thus receiving a constant motion in one direction, and being carried on the carriage A, is ready to yield any amount of power required to work the carriage A with its connections in either direction. $I^2$ is a bevel-wheel on the said shaft I, gearing into two bevel-wheels, $J^1$ and $J^2$, which turn loosely in opposite directions on the sleeve J, which is supported in bearings on the carriage A, and carries a spur-gear wheel, $J^3$, which meshes into the rack $A^2$, a long slot in the side of the sub-frame being provided to allow it to move forward and back. K is a slender shaft mounted within the sleeve J, and free to turn in either direction therewith. It is moved axially at will by a hand-lever, K′, and thereby operates arms $k^1$ $k^2$, which expand the elastic curved pieces L L, and cause them to take hold of the bevel-wheels $J^1$ $J^2$ alternately, as the shaft K is moved in one direction or the other. The exact proportion of these clutches need not be detailed, as they will offer no difficulty to skilled mechanics. It may be practicable to variously modify this part of the mechanism, one plan being to make the sleeve J a solid shaft capable itself of a sufficient end motion; but I prefer the plan shown, in which the interior shaft K connects through short slots in the sleeve J by means of the arms $k^1$ $k^2$, and causes them to act wedgewise in the openings in the friction-bands L, mounted in the back faces of the wheels $J^1$ $J^2$. The result is a turning of the wheel $J^3$ in one direction or the other at will, and a consequent movement of the entire carriage A and its attachments toward or from the retorts at will, according as the hand-lever K′ is inclined one way or the other. M M are sector-shaped pieces, adapted to roll on the same track which forms the tread for the supporting-wheels *a*; or a separate track may be mounted near it and adapted to act with precision. The sectors M are mounted on a shaft, *m*, supported in bearings in the carriage A. As the carriage A moves backward the friction of the sector-pieces M on the ways below causes them to roll, and thereby to turn the shaft *m* until it reaches the position represented, where it remains, sliding on the way until the motion of the carriage A is reversed, when the friction induces a corresponding change of position of the sector-pieces and shaft. In a forward motion of the carriage A the friction causes the sector-pieces M to roll on the way until it has arrived at the other extreme position, when it again commences to slide, and continues to slide so long as the carriage A moves forward; but the moment the forward motion of the carriage A is arrested and it commences to move backward, the friction of the sector-pieces M commences to again change the position of the shaft *m*.

There are, as will be observed, two sets of the levers E. The uppermost are keyed on a shaft, *e*, which turns freely in bearings in the carriage A. The levers are extended beyond the shaft and slightly bent. On the bent extension E′ is mounted the adjustable weight F, provided with set-screws *f f*, by which it can be held at any distance desired from the axis or shaft *e*, so as to most efficiently balance the weight of the jumping frame and its connections. The lower lever or series of levers E is keyed on a shaft, *m*, the position of which is controlled by the sector-pieces M, as before described. It follows that at each change of motion of the carriage A the partial rolling of the sector-pieces M and shaft *m* induces a rising and backward motion or a sinking and forward motion of the jumping frame B, with its rake D and other connected parts.

The proportions of the parts are such that the forward motion of the jumping frame B, in its descent, is just about equal to the backward motion of the carriage A required to induce it, so that, although carriage A commences to traverse actively backward before the rakes *d* have descended into their respective beds of coke, the descent of each rake is practically vertical. Means (not represented) are provided for arresting the motion of the foundation-carriage X at or near the right position opposite each vertical series of retorts; but it will sometimes happen that the raking mechanism requires a slight adjustment to one side or the other after the carriage X is stopped. I provide for this by sliding the transverse carriage $B^1$ a little to one side or the other on its dovetailed supports *b*′. The engineer or operator holds with one hand the hand-lever O, which is adapted to swing horizontally on a fixed bearing in the jumping frame B, and give motion to the carriage $B^1$ by means of a rack in the rear face of the latter, as fully shown in Fig. 3.

By means of this lever the carriage $B^1$ and the series of rakes D D D may be moved laterally several inches, when required, without interfering with their vertical or their forward and backward motion.

The shaft *m* is pressed downward by springs H acting on the binders $A^1$. The effect is to induce an even and regular friction on the sector-pieces M M, notwithstanding slight inequalities in the way on which they move.

I find it is important to hold the jumping frame very steady during the backward motion. To insure this I provide small stops $B^2$ on its back edges, which extend out a little and engage with the main frame A, or with small projections thereon, as will be obvious.

I claim as my invention—

1. In combination with a carriage, A, moving forward and backward on the support X, the rising and sinking frame B, rakes D *d*, and means for raising and lowering them, so as to enter the retorts in an elevated, and return in a depressed, position, as herein specified.

2. The knuckle-joints C between the rake-levers D, and the rising and sinking frame and its connections, as herein specified.

3. In combination with traversing carriage A, rising and sinking frame B, and connected rakes D *d*, the transverse carriage $B^1$ and adjusting means O, arranged to allow the adjustment of the rakes to one side or the other within moderate limits, as herein specified.

4. The friction-sectors M and spring H, in combination with the traversing carriage A and its operating means, rising and sinking frame B, rakes D *d*, and a balancing or partially-balancing means, F, arranged as shown, so that the changes of motion of the carriage A will elevate or depress the rakes, as herein specified.

5. The stops $B^2$ on the jumping frame, arranged to serve relatively to the main frame A, and to the means of raising and lowering, B, as and for the purposes herein specified.

6. The water-connections D′, in combination with the hollow levers D, rakes *d*, and means for operating them, as herein specified.

7. In a machine arranged to withdraw coke or other substances from retorts, a rake, *d*, and rake-handle D, combined with mechanism for elevating them together as they enter the retort, and depressing them upon their withdrawal, substantially as described.

8. A mechanical rake combined with mechanism for adjusting it to the center of the retort or other desired position independent of the mechanism for moving the main carriage, substantially as described.

9. A rake and rake-carriage, combined with mechanism which, upon the forward motion of the carriage, automatically raises the rake, so that it passes into the retort free of the coke, and which, upon the backward motion of the carriage, drops the rake into the coke, substantially as described.

10. The combination of a rake-carriage having a motion parallel to the retorts, and a motion at right angles to the first motion, thereby carrying the rake into the retorts, with a rake having a separate lateral adjustment, so that the controlling operator is enabled to enter the rake at any part of the retort, substantially as described.

THOS. F. ROWLAND.

Witnesses:
E. N. DICKERSON, JR.,
WARREN E. HILL.